United States Patent [19]
Tulip

[11] Patent Number: 5,386,431
[45] Date of Patent: Jan. 31, 1995

[54] REGENERATIVE AMPLIFIER LASER ARRAY

[76] Inventor: John Tulip, 11625 Edinboro Rd., Edmonton, Alberta, Canada, T6G 1S2

[21] Appl. No.: 72,111

[22] Filed: Jun. 7, 1993

Related U.S. Application Data

[63] Continuation-in-part of Ser. No. 822,035, Jan. 14, 1992, abandoned.

[51] Int. Cl.$^6$ .......................... H01S 3/08; H01S 3/10; H01S 3/098
[52] U.S. Cl. ........................................ 372/68; 372/64; 372/87; 372/95; 372/97; 372/108; 359/346; 359/348
[58] Field of Search ..................... 372/68, 18, 64, 92, 372/93, 82, 83, 97, 99, 66, 87, 103, 95, 108; 359/340, 342, 346, 347, 348

[56] References Cited

U.S. PATENT DOCUMENTS

| | | | |
|---|---|---|---|
| 4,264,868 | 4/1981 | Leland et al. | 359/342 |
| 4,656,641 | 4/1987 | Seifres et al. | 372/99 |
| 4,719,639 | 1/1988 | Tulip | 372/66 |
| 4,796,272 | 1/1989 | Klingel | 372/87 |
| 4,807,232 | 2/1989 | Hart et al. | 372/18 |
| 4,813,052 | 3/1989 | DeMaria et al. | 372/64 |
| 4,849,986 | 7/1989 | Boerner et al. | 372/97 |
| 4,879,721 | 11/1989 | Braski et al. | 372/18 |
| 4,884,282 | 11/1989 | Bridges | 372/97 |
| 4,922,502 | 5/1990 | Unternahrer et al. | 372/66 |
| 4,939,738 | 7/1990 | Opower | 372/95 |
| 5,029,173 | 7/1991 | Seguin | 372/23 |
| 5,088,104 | 2/1992 | McLellan | 372/87 |
| 5,153,892 | 10/1992 | Kawakubo et al. | 372/87 |
| 5,210,768 | 5/1993 | Seguin | 372/92 |

FOREIGN PATENT DOCUMENTS

| | | | |
|---|---|---|---|
| 0448319A2 | 9/1991 | European Pat. Off. | H01S 3/03 |
| 1556589 | 2/1968 | France | |

OTHER PUBLICATIONS

J. G. Xin and D. R. Hall, "Compact Multipass Single Transverse mode $CO_2$ Laser", Appl. Phys. Lett. 51(7), 17 Aug. 1987, pp. 469-471.

Controlled fundamental supermode operation of phase-locked arrays of gain-guided diode lasers, E. Kapon, J. Katz, S. Margalit and A. Yariv, App. Phys. Lett. 45(6), 15 Sep. 1984, pp. 600-602.

Frequency Locking of Modes in a Ring Laser, Hermann A. Haus, Hermann Statz and Irl W. Smith, IEEE Journal of Quantum Electronics, vol. QE-21, No. 1, pp. 78-85, 1985. Jan.

Perturbation analysis of nearly univorm coupled waveguide arrays, R.R.A. Syms. Applied Optics/vol. 25, No. 17/ 1 Sep. 1986, pp. 2988-2995.

Phase locking of waveguide $CO_2$ lasers as a result of a four wave interaction of light beams in an absorbing liquid, A. V. Bondarenko, A. F. Glove, F. V. Lebedev, V. V. Likhanskii, K. A. P. Napartovich, V. D. Pis'mennyi,m and Yartsev, Sov. J. quantum Electron. 18(5), May 1988, pp. 563-564.

Coupled resonator beam combining, G. E. Palma and W. J. Fader, United Technologies Research Center, East Hartford, Conn. 06108, pp. 153-160, 1983. No month available.

(List continued on next page.)

Primary Examiner—Rodney B. Bovernick
Assistant Examiner—Robert McNutt
Attorney, Agent, or Firm—Anthony R. Lambert

[57] ABSTRACT

A slab laser amplifier array includes a plurality of parallel, stacked, laser resonators, with each resonator having a walk-off mode of propagation of laser light from an input side of the resonator to an output side of the resonator where the exiting light diffracts around the resonator mirror. A source of a plurality of phase related, for example co-phasal, light beams supplies phase related light to each input side. The source of phase related light may be a source of one single mode beam followed by a telescope with an aperture having plural stops or a co-phasal array of laser resonators. A laser array of open resonators also has circular concentric electrodes.

17 Claims, 10 Drawing Sheets

OTHER PUBLICATIONS

Principles of Optical Phase-Locking: Application to Internal Mirror He-Ne Lasers Phase-Locked via Fast Control of the Discharge Current, John L. Hall, M. A. Long-Sheng and G. Kramer, Journal of Quantum Electronics, vol. QE, No. 4, Apr. 1987, pp. 427–437.

High-order (v>10) eigenmodes in ten-stripe gain guided diode laser arrays, G. R. Hadley, J. P. Hohlmer, and A. Owyoung, Appl. Phys. Lett. 49(12), 22 Sep. 1986, pp. 684–686.

High power coupled $CO_2$ waveguide laser array, L. A. Newman, R. A. Hart, J. T. Kennedy, A. J. Cantor, and A. J. DeMaria, Appl. Phys. Lett. 48(25), 23 Jun. 1986, pp. 1701–1703.

Offset Frequency Stabilization of RF Excited Waveguide $CO_2$ Laser Arrays K. M. Abramski, Alan D. Colley, H. J. Baker, and Denis R. Hall, Journal of Quantum Electronics, vo. 26, No. 4, Apr. 1990, pp. 711–717.

Phase locking of adjacent channel leaky waveguide $CO_2$ lasers, D. G. Youmans, Appl. Phys. Lett. 44(4), 15 Feb. 1984, pp. 365–367.

Staggered Hollow-bore $CO_2$ waveguide laser array, R. A. Hart, L. A. Newman, A. J. Cantor, and J. T. Kennedy, Appl. Phys. Lett. 51(14), 5 Oct. 1987, pp. 1057–1059.

Phase Plates For Laser Beam Compensation, Lee W. Casperson, Nancy K. Kincheloe and Oscar M. Stafsudd, vol. 21, No. 1, Optics Communications, Apr. 1977, pp. 1–4.

Phase-Locked Injection Laser Arrays with Integrated Phase Shifters, RCA Review-vol. 44-Dec. 1983, pp. 625–633.

Use of a Phase Corrector Plate to Generate a Single-Lobed Phased Array Far Field Pattern, J. R. Heidel, R. R. Rice, and H. R. Appelman, Journal of Quantum Electronics, vol. QE-22, No. 6, Jun. 1986, pp. 749–752.

Stable quasi 0° phase mode operation ina laser array diode nearly asligned with a phase shifter, M. Taneya, M. Matsumoto, S. Matsui, S. Yano, and T. Hijikata, Appl. Phys. Lett. 40(13), 30 Mar. 1987, pp. 783–785.

Aperture filling of phase-locked laser arrays, Gary J. Swanson, James R. Leger, and Michael Holz, Apr. 1987/vol. 12, No. 4/Optics Letters, pp. 245–247.

Properties of an array of phase-locked $CO_2$ lasers, O. R. Kachurin, F. V. Lebedev and A. P. Napartovich, Sep. 1988.

Area scaling boosts $CO_2$-laser performance, Denis R. Hall and Howard J. Baker, Laser Focus World, Oct., 1989, pp. 77–80.

RF Excited $CO_2$ Flow Lasers, H. Hugel, from Gas Flow and chemical Lasers, 6th International Conf. Sep. 8–12, Jerusalem, 1986, pp. 258–264.

A. Lapucci and G. Cangioli, Triple slab radio-frequency discharged $CO_2$ laser, Appl. Phys. Lett. 62(1), 4 Jan. 1993, pp. 7–9.

C. P. Wang; Master and slave oscillator array system for very large multiline lasers; Jan. 1, 1978; pp. 83–86.

Karl. D. Stephan; Inter-Injection-Locked Oscillators for Power Combining and Phased Arrays; Oct., 1986; pp. 1017–1025.

G. I. Kozlov, V. A. Kuznetsov, and V. A. Masyukov; High-power multiline cw $CO_2$ laser; pp. 53–54, 1978. Feb.

Carl J. Buczek, Robert J. Freiberg, and M. L. Skolnick; Laser Injection Locking; Oct. 1973; pp. 1411–1431.

Monte Ross; Laser Receivers, System Considerations and Configurations; 1966; pp. 362–365. (No month available).

Irving J. Bigio and Michael Slatkine; Injection-Locking Unstable Resonator Excimer Lasers; Sep., 1983; pp. 1426–1436.

V. V. Antyukhov, E. V. Dan'shchikov, N. N. Elkin, V. A. Korotkov, F. V. Lebedev, V. V. Likhanskii, A. P. Napartovich, V. D. Pis'mennyi, and V. E. Troshchiev; Conditions for stable coherent operation of two $CO_2$ lasers with unstable resonators; Dec., 1989; pp. 1582–1586.

W. P. Latham, Weapons Laboratory, M. E. Rogers, United States Air Force Academy, G. E. Palma, United Technologies Research Center; A Review of Laser Device Coupling Techniques; pp. 184–201, 1990. (No month available).

Page of proceedings of seminar Tuesday Afternoon (continued), listing a session entitled: Session TB (Continued): "Compact RF Carbon Dioxide Slab Lasers with All-Waveguide Resonators:", H. J. Baker, K. M. Abramski, A. D. Colley, C. J. Shackleton, and D. R. Hall, Herlot-Watt Univ., U. K., Dec., 1991.

Radiation emitted by optically coupled lasers, V. V. Likhanskii and A. P. Napartovich, Sov. Phys. Usp. 33(3), Mar. 1990, pp. 228–252.

Theory of Two Coupled Lasers, Walter J. Fader, IEEE Journal of Quantum Electronics, vol. QE-21, No. 11, Nov. 1985, pp. 1838–1844.

REGENERATIVE AMPLIFIER LASER ARRAY

This application is a continuation in part of co-pending application Ser. No. 07/822,035 filed Jan. 14, 1992, abandoned Feb. 16, 1994.

FIELD OF THE INVENTION

This invention relates to laser arrays.

BACKGROUND OF THE INVENTION

Slab $CO_2$ lasers were first disclosed in U.S. Pat. No. 4,719,639 which was granted to the inventor of the present invention. Slab $CO_2$ lasers are formed from a pair of spaced apart parallel electrodes forming a channel between them, the channel having resonator mirrors positioned at opposite ends of the channel. Slab $CO_2$ lasers also include a low pressure lasing gas ($CO_2$), a power source of radiofrequency electromagnetic excitation for the electrodes and means for cooling the electrodes, but each of these features is well understood in the art and will not be described in any detail.

While these lasers are compact and powerful, and the slab $CO_2$ laser represents a major advance in the art, these lasers do have limitations. The stable slab $CO_2$ laser resonator will oscillate in a single mode up to a Fresnel number of 5. The Fresnel number for a laser is defined by $N_F = a^2/\lambda d$, where a is half of the aperture, $\lambda$ is the wavelength of the light propagating in the laser and d is the length of the laser. For lasers of a reasonable length for commercial purposes this limits the beam width and therefore the electrode width to 1 cm or less.

A particular advantage of the slab $CO_2$ laser with a stable resonator is that the quality of the output beam is good, and this enables the beam to be focused to a diffraction limited focal spot. However, the limitation on the size of the electrode width means the power output is limited.

One solution to the problem of increasing the power of a $CO_2$ slab laser with a stable resonator is to use an array of coupled lasers to obtain improved output power. Such a $CO_2$ slab laser array has been described in my co-pending U.S. Pat. application No. 07/822,035 filed Jan. 14, 1992 abandoned Feb. 16, 1994. This type of slab laser array typically consists of a pair of opposing electrodes disposed to form a light guiding channel together with resonator mirrors placed at each end of the channel and means to divide the channel into a plurality of open resonators. An open resonator is a resonator that is not confined in one dimension by a waveguiding wall. The individual open resonators are coupled together by diffraction so that the array of lasers becomes coupled. The resulting array of emerging laser beams is phase related in that adjacent lasers are 180° out of phase. This is known in the art as an anti-phasal array. A phase correcting plate introduced into the output beam path will phase shift the adjacent laser elements by 180° so that the beams emerging from the phase shift the adjacent laser elements by 180° so that the beams emerging from the phase plate are in phase; this is referred to as a co-phasal array of lasers. This type of array may be focused to an essentially single small diffraction limited spot which is a desirable feature of a $CO_2$ laser for many applications. Because of the strong coupling between adjacent lasers in the slab laser array, as compared with for example a waveguide laser array, it is possible to couple many laser elements together and to use electrodes several centimeters wide. This results in a relatively high powered laser array.

Increasing the length and width of the electrodes used in a slab laser array will increase the laser power available. The area of electrodes in a slab laser is however limited and cannot be increased arbitrarily, due to thermal deformation of the electrodes and difficulties in matching the applied rf power to the electrodes.

A solution to the problem of using large electrodes is to use an array of smaller electrode slab $CO_2$ lasers. It is possible to use an array of slab lasers so that their discharges are connected electrically in series. This electrical arrangement results in a relatively high voltage, low current or high impedance discharge load which is more compatible with a vacuum tube radio frequency power generator. To be useful the outputs from an array of slab lasers must be phase related, since a cophasally related array of laser beams may be combined coherently and focused to a diffraction limited spot. Phase locking of an array of slab lasers with separate electrodes is difficult to achieve using diffraction coupling between waveguide channels. The channels are typically physically remote because of the size of the electrodes so light diffracting from one channel must traverse a large optical path length before reaching another channel.

The inventor proposes a solution to the problem of obtaining phase related output from a slab laser array by using slab lasers as a regenerative amplifier array. When used as a regenerative amplifier, the slab laser is used in a multipass mode, where the laser beam zig-zags across the channel between two mirrors placed at the ends of the electrodes. If a phase related array of laser beams is introduced into an array of slab laser amplifiers and if the amplifiers share common end mirrors then a phase related array of output laser beams may be obtained.

Since the amplified laser beam will traverse a long path length as it zig-zags between end mirrors, one might expect small path length differences caused by mirror imperfections and mechanical misalignment of electrodes and mirrors to cause phase differences in the array of amplified output beams. However, the mirrors and electrodes of a zig-zag slab waveguide amplifier may be operated with closely spaced beam paths that result in spacial interference between adjacent paths, similar to interference effects in a waveguide. The amplifier mirrors act to guide the amplified light across the width of the electrodes. Small adjustments of these mirrors will hence influence the mode of propagation across the amplifier. The mirrors may be adjusted to produce a continuous phase front across-the width of the amplifier in which the beam paths all interfere constructively. If the amplifier mirrors are plane, the phase front across the amplifier will also be plane. Curved mirrors will result in a curved phase front. The emerging beam will diffract over the output edge of the amplifier mirrors and propagate in a diffraction limited manner as is characteristic of a continuous phase laser beam.

If an amplifier array shares two mirror surfaces then the array of amplified beams will emerge with the same phase as that established by the mirror surface and the beams will hence be phase related.

For efficient operation of a laser amplifier, a long path length is desirable, but in such a case the amplifier may excite spontaneous walk off oscillation in the laser, where spontaneous emission of light is amplified across the amplifier. The resulting output beam may have poor modal quality, and an array of such beams is difficult to couple. To obtain phase related output from a phase related array of regenerative laser amplifiers it is necessary to couple a phase related array of laser beams into the amplifiers. When phase related laser beams are introduced into the amplifier the amplified light will suppress spontaneous oscillation and a diffraction limited output may be obtained. An array of regenerative amplifiers under the condition in which the mirrors are adjusted for the laser to be above the threshold for spontaneous walk off oscillation may also be referred to as an injection locked resonator array. The amplifier mirrors will hence be referred to as resonator mirrors. Each laser beam coupled to the amplifiers must have a continuous phase front or in other words be spatially coherent. Such an array may be generated by expanding the beam from a single mode laser oscillator using a cylindrical telescope and then passing this beam through an aperture which matches the spatial beam pattern required by the amplifiers. This arrangement is however inefficient because the intensity of the resulting beams is low and most of the laser light is stopped by the aperture.

A more efficient source of phase related laser beams is a slab laser oscillator array as described in U.S. Pat. application Ser. No. 07/822,035, abandoned Feb. 16, 1994. Such a laser array generates a multiplicity of phase related beams. The output from this type of laser array consists of two coincident light beams propagating at a small angle with respect to each other. This angle, $\theta$, is given by $$\theta = a/2\lambda$$

where a is the width of the laser resonator in the open plane of the array, $\lambda$ is the laser wavelength. Coincidentally the light propagating in a waveguide may be resolved into two plane waves propagating at a small angle with respect to each other. In this case the small angle $\phi$ for the lowest order mode of the waveguide is given by $$\phi = h/2\lambda$$

where h is the size of the waveguide channel. If $h=a$ then the beam from a slab laser array will efficiently excite the first order propagation in a slab laser amplifier because the propagation angle $\theta$ and $\phi$ are equal and because the oscillator beam width a matches the amplifier channel size h.

In the far field or focus of a phased array of laser beams, the light distribution is a central lobe with symmetrically disposed side lobes. The relative intensity of the central lobe and side lobes is determined by the shape of the laser array. If the beams in the array are close and almost touching, the side lobes are very weak. If the beams of the array are spatially separated, the side lobes may be more intense than the central lobe. Since side lobes are highly undesirable for applications where a small focal spot is needed, an array of closely spaced beams is desirable. The beams from the regenerative amplifier array must be spaced by the thickness of the electrodes at the output side. It is hence desirable to expand the individual beams in the plane perpendicular to the electrodes so that the beams almost overlap. This may be done using lens arrays as are commonly used for correcting diode laser arrays. A method of avoiding such a lens array has been proposed in which the electrodes are tapered toward the output side. In this case, the beams emerging from the amplifier laser array would be more closely spaced and hence produce weaker side lobes. Such tapered electrodes would however add mechanical complexity to the amplifier array.

There is therefore proposed in one embodiment of the invention, a slab laser regenerative amplifier array including a plurality of phase related laser resonators, with each resonator having a walk-off mode of propagation of laser light from an input side of the resonator to an output side of the resonator where the exiting light diffracts around the resonator mirror. A source of a plurality of phase related light beams supplies phase related, for example co-phasal, light to each input side. The source of phase related light may be for example a source of one single mode beam followed by a telescope and plural apertures or a phase related array of laser resonators.

BRIEF DESCRIPTION OF THE DRAWINGS

There will now be described preferred embodiments of the invention, with reference to the drawings, by way of illustration, in which like numerals denote like elements and in which.

DETAILED DESCRIPTION OF PREFERRED EMBODIMENTS

The characteristics of the $CO_2$ slab laser are described for example in the U.S. Pat. No. 4,719,639.

Figure 1:
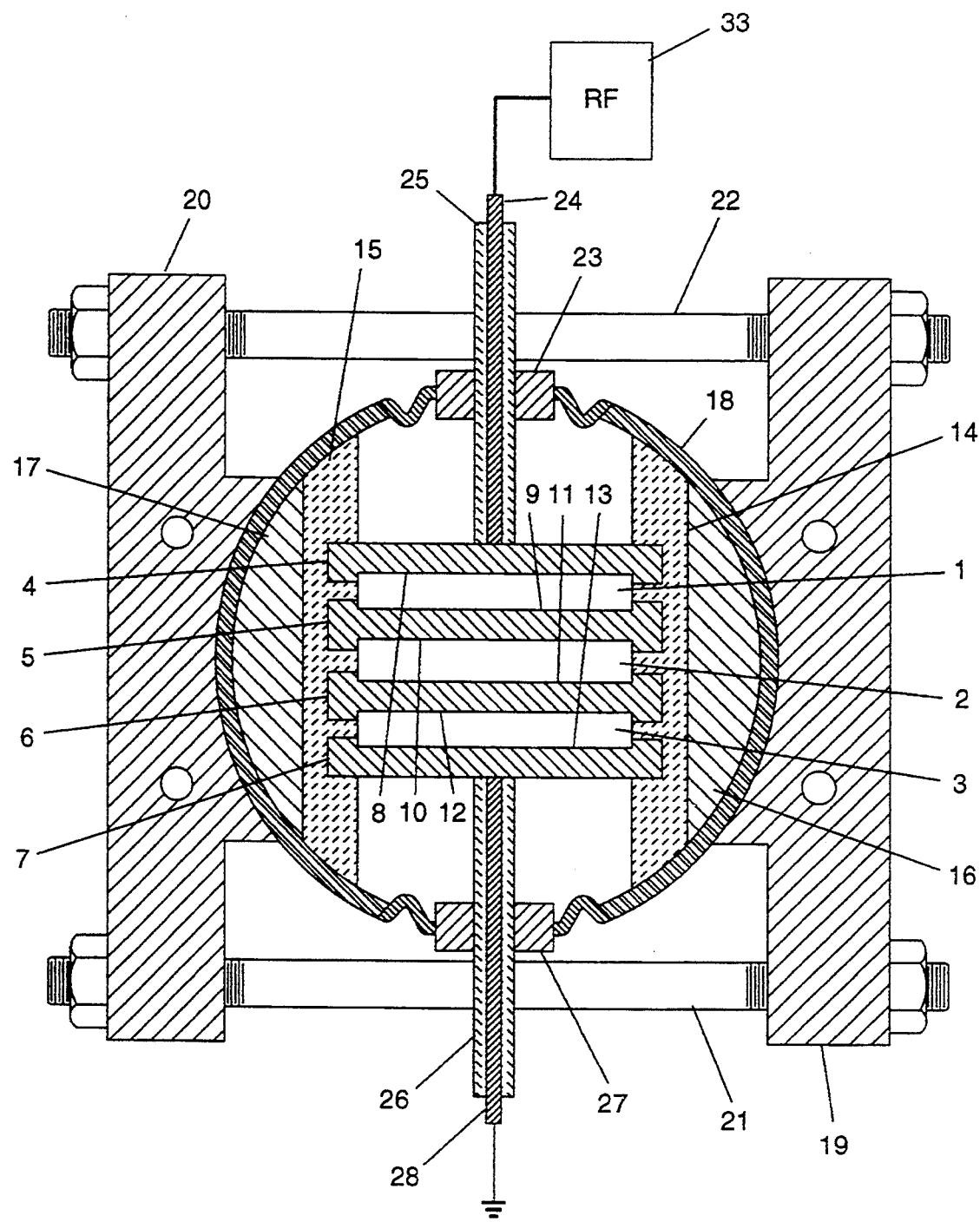
FIG. 1 is a side section through an array of slab lasers connected electrically in series.

Referring to FIG. 1, a slab laser amplifier array includes parallel laser waveguide channels 1, 2 and 3 formed between electrodes 4, 5, 6, 7. Three channels are shown but the invention is believed to work with two or more channels, and therefore two or more resonators, with added complexity as the number of channels increases. Electrode surfaces 8, 9, 10, 11, 12, 13 are polished so that the channels 1, 2, 3 will efficiently guide light. The electrode surfaces 8, 9, 10, 11, 12 and 13 are oxidized using an anodization process. In this embodiment the electrodes are about 2.5 mm thick, 3 cm wide and 20 cm long and are fabricated from aluminum. The gap defining the waveguide channel is also about 2.5 mm.

The electrodes are supported by slots cut into ceramic insulators 14, 15. Cooling of the electrodes takes place by conduction from the metal of the electrode to the ceramic. This conduction cooling may be facilitated by pressing indium foil between the electrodes and the ceramic insulator. The ceramic insulators are cooled through conduction to aluminum headers 16, 17 which transfer the heat to the walls of the vacuum enclosure 18. The external surface of the vacuum enclosure 18 is cooled by two aluminum water cooling jackets 19, 20 pressed against the surface of the vessel. Bolts 20, 21 press the cooling jacket to the enclosure. The vacuum enclosure 18 is fabricated from thin walled stainless steel. Consequently, the force of the bolts 21, 22 slightly deforms the vacuum enclosure 18 and presses all conducting members together in order to maximize heat transfer. The vacuum enclosure 18 is evacuated and filled with laser gases suitable for slab laser operation.

Electrical connection is made to the electrodes using vacuum feedthroughs 23, 27. Metal pins 24, 28 pass through respective feedthroughs and provide external electrical contact with the electrodes 4 and 7. Ceramic insulators 25, 26 cover the pins which prevents breakdown to the metal vacuum enclosure.

One feedthrough pin shown here for example as pin 24 is connected to a radio frequency power generator 33. The other pin is connected to ground potential. Power is coupled to the electrodes using conventional radio frequency matching techniques. Electrical current passing through the electrodes must pass through all electrodes and all electrode channels. A high frequency electrical discharge is hence struck in all three channels 1, 2 and 3 which are said to be in electrical series, with the laser resonators formed in the channels 1, 2 and 3 sharing common electrodes (for example, channels 1 and 2 share electrode 5).

Figure 2A:
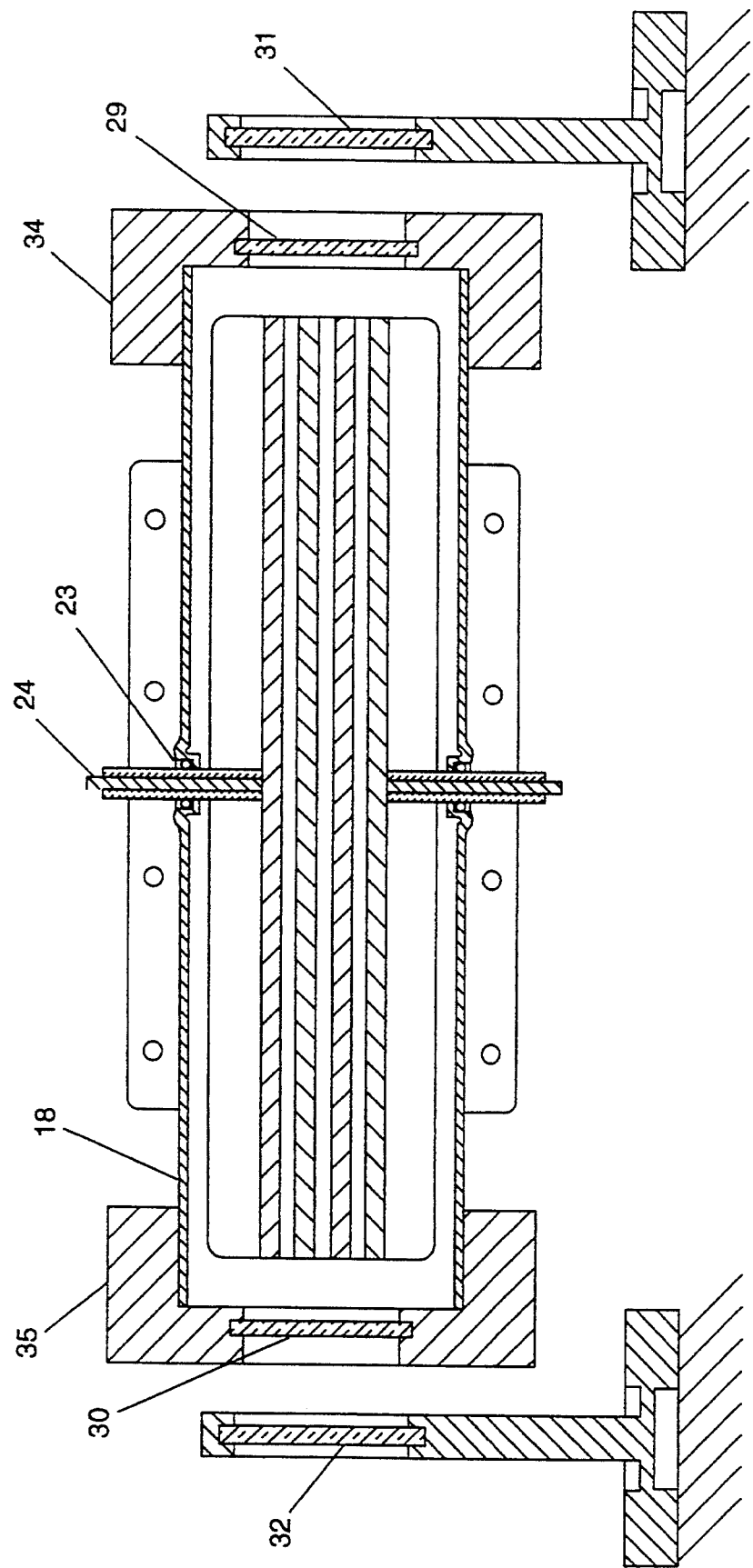
FIG. 2A is a longitudinal section through the array of FIG. 1.

Referring now to FIG. 2A, which shows a side view of the amplifier array, the vacuum enclosure has vacuum tight laser windows 29, 30 mounted at each end of the enclosure in flanges 34, 35 respectively. The windows 29, 30 are transparent to light passing in both directions through them. Resonator mirrors 31 and 32 are mounted at opposed ends of the vacuum enclosure, hence at first and second ends of each of the channels 1, 2 and 3. The amplifier mirrors 31 and 32 form a resonator and are totally reflecting. The mirrors 31 and 32 are preferably about 21 cm apart and are positioned about 5 mm from the ends of the electrodes.

In the embodiment shown in FIG. 2A, mirrors 31' and 32' are positioned at respective first and second ends of the vacuum enclosure 18 and hence of the channels 1, 2 and 3 to define a laser resonator in each of the channels 1, 2 and 3. The mirrors 31' and 32' are plane and slightly rotationally misaligned about an axis perpendicular to the plane of the channels 1, 2 and 3 so as not to be parallel. The plane of the channels is the plane perpendicular to both of the sections shown in FIGS. 1 and 2A, namely the plane of the FIGS. 2B and 2C. In a preferred embodiment, the mirrors 31' and 32' are rotationally offset about 3 milliradians to each other. The mirrors 31' and 32' are however parallel in the plane of the section shown in FIG. 2A (as so shown). Light entering the resonator at one side as shown at 36 reflects off the misaligned mirrors and gradually walks off the resonator in the plane of the channel to the other side as illustrated schematically by the zig-zag arrows 37. Laser light exits this resonator at 38 as a diffraction coupled output beam.

Figure 2B:
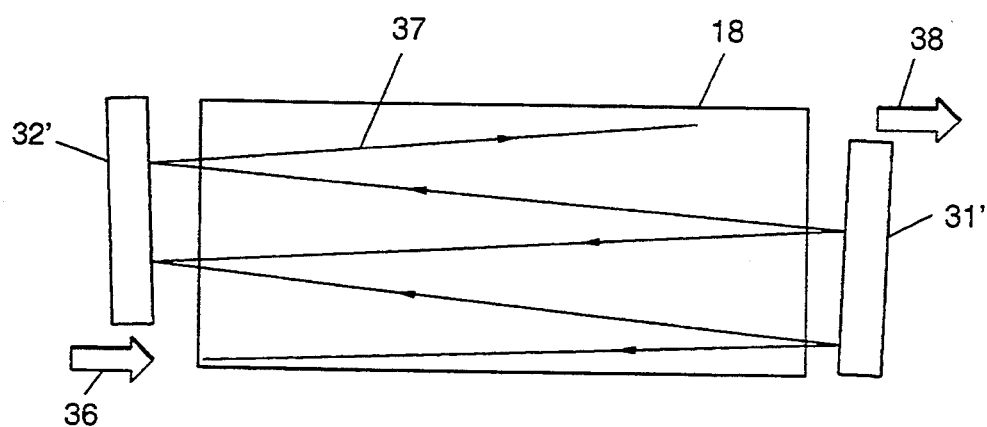
FIG. 2B is a top view schematic of a laser array showing a planar walk-off resonator.
Figure 2C:
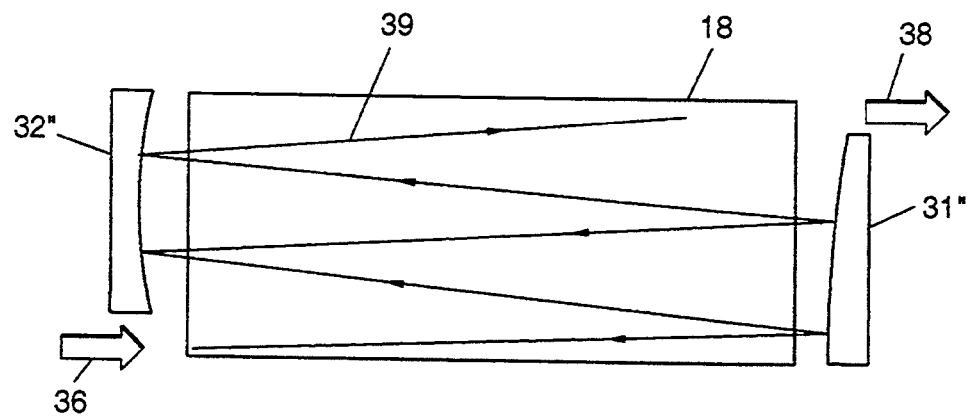
FIG. 2C is a top view schematic of a walk-off resonator with curved mirrors.

An alternative arrangement of the mirrors is shown in FIG. 2C in which mirrors 31" and 32" are slightly curved confocal mirrors with radii chosen in accordance with known techniques for forming unstable resonators, with for example a magnification of 1.1. Again, light entering the resonator at one side as shown at 36 reflects off the mirrors 31" and 32" and gradually walks off the resonator at the other side as illustrated schematically by the zig-zag arrows 39. Laser light exits the resonator at 38 as a diffraction coupled output beam.

Each mirror 31', 32', 31" and 32" is preferably a single mirror disposed about all of the laser channels 1, 2 and 3, and thus form phase related resonators for each channel. The mirrors must provide similar path lengths for the laser light walking through the channels, and hence need to have a known surface configuration within a fraction of a wavelength. Thus, while separate mirrors could be used, these are difficult to adjust and are not preferred.

Figure 3:
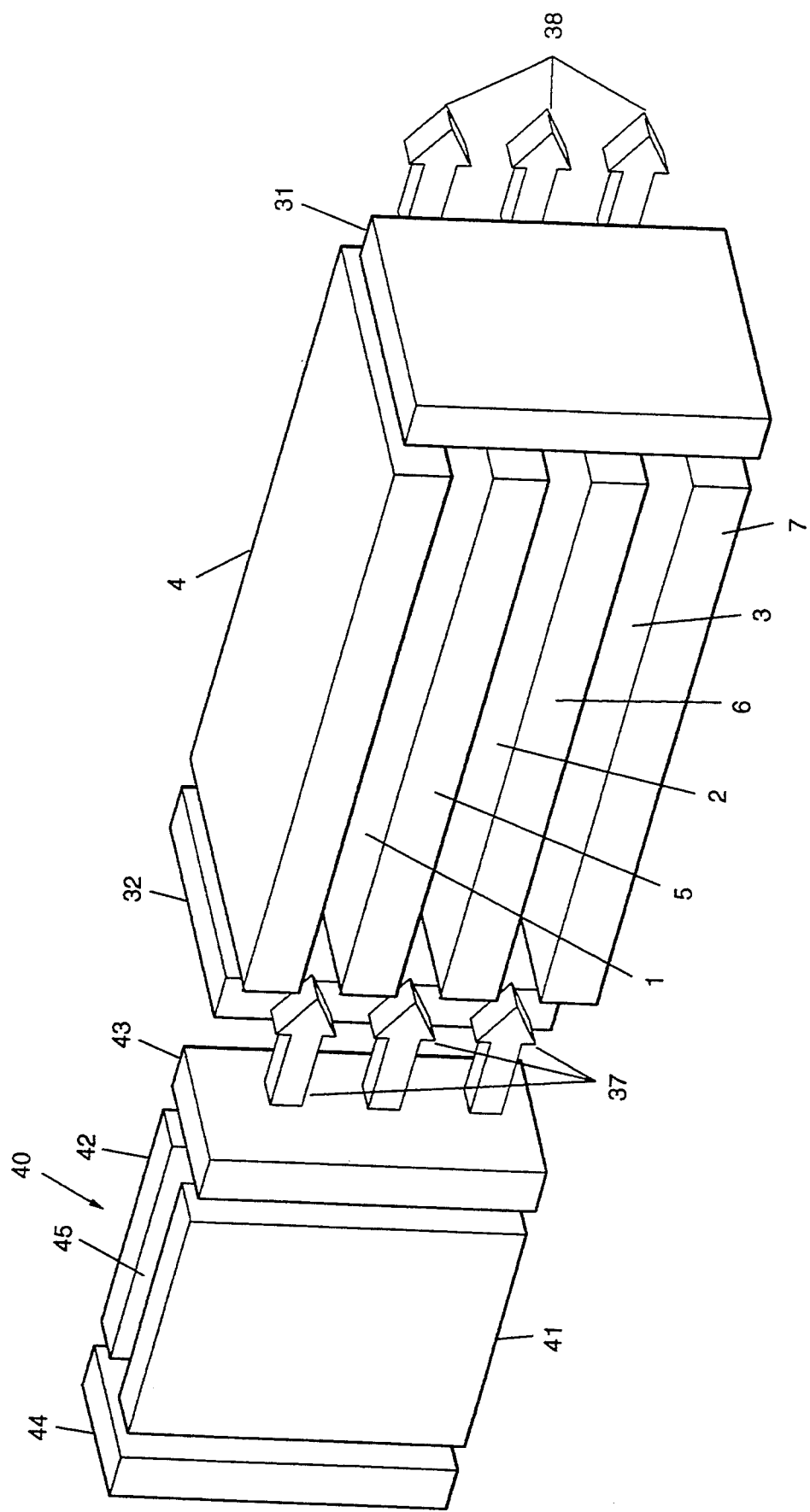
FIG. 3 is a schematic showing an array of slab lasers together with a source of phase related input laser beams for the array.

A source of phase related light for the array shown in FIGS. 1 and 2A is shown in FIG. 3. The phase related light is indicated by arrows 37 and simultaneously enters each channel 1, 2 and 3 at one side. As illustrated in FIGS. 2B and 2C, the light in the channels walks off the resonator by reflection from the mirrors 31 and 32 and exits the resonator at the other side of the resonator by over the edge diffraction as indicated at 38. The phase related light may be cophasal or anti-phasal or related in some other way.

Figure 4:
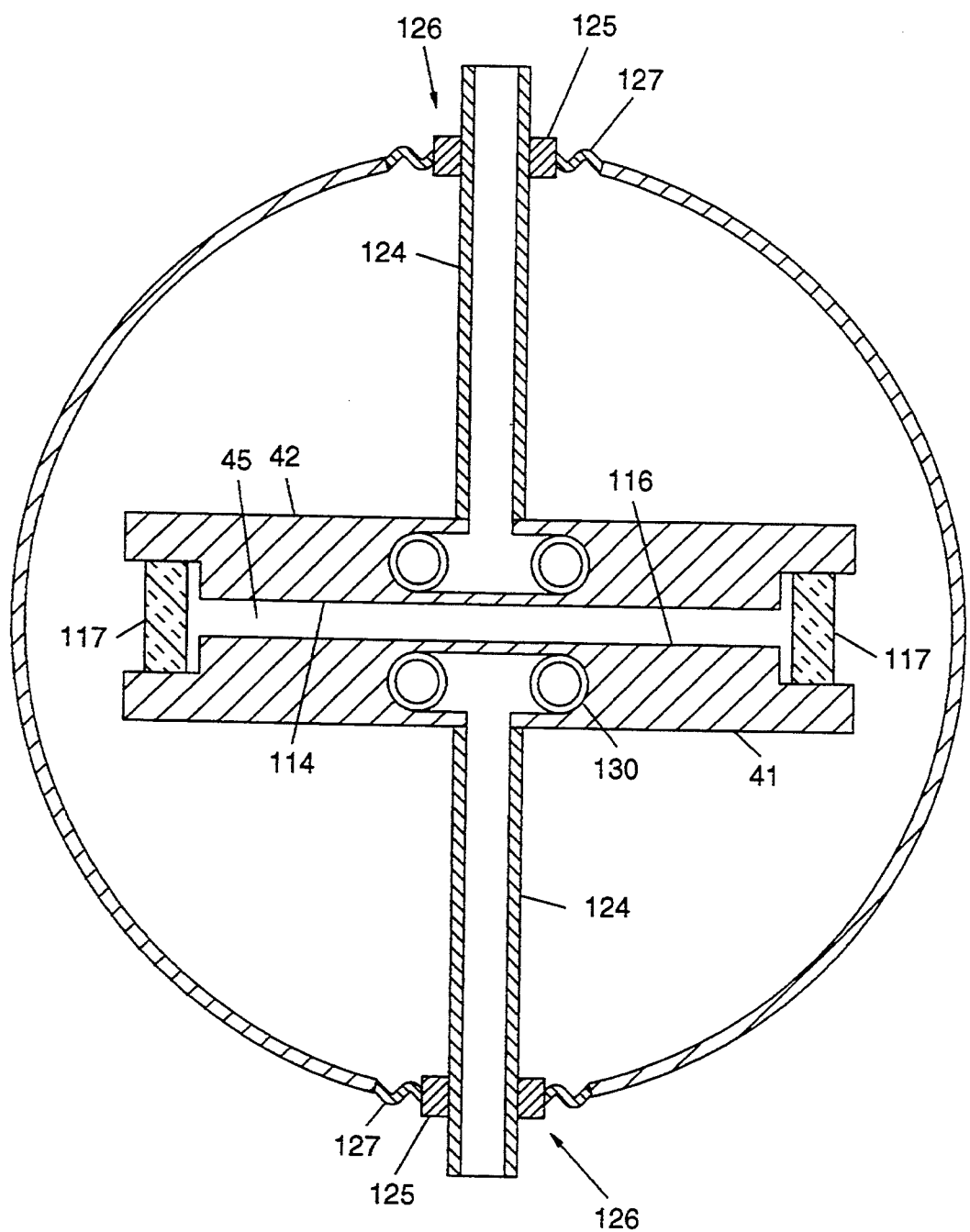
FIG. 4 is a schematic cross-section of the structure of a $CO_2$ slab laser array for use as a source of co-phasal input.
Figure 5:
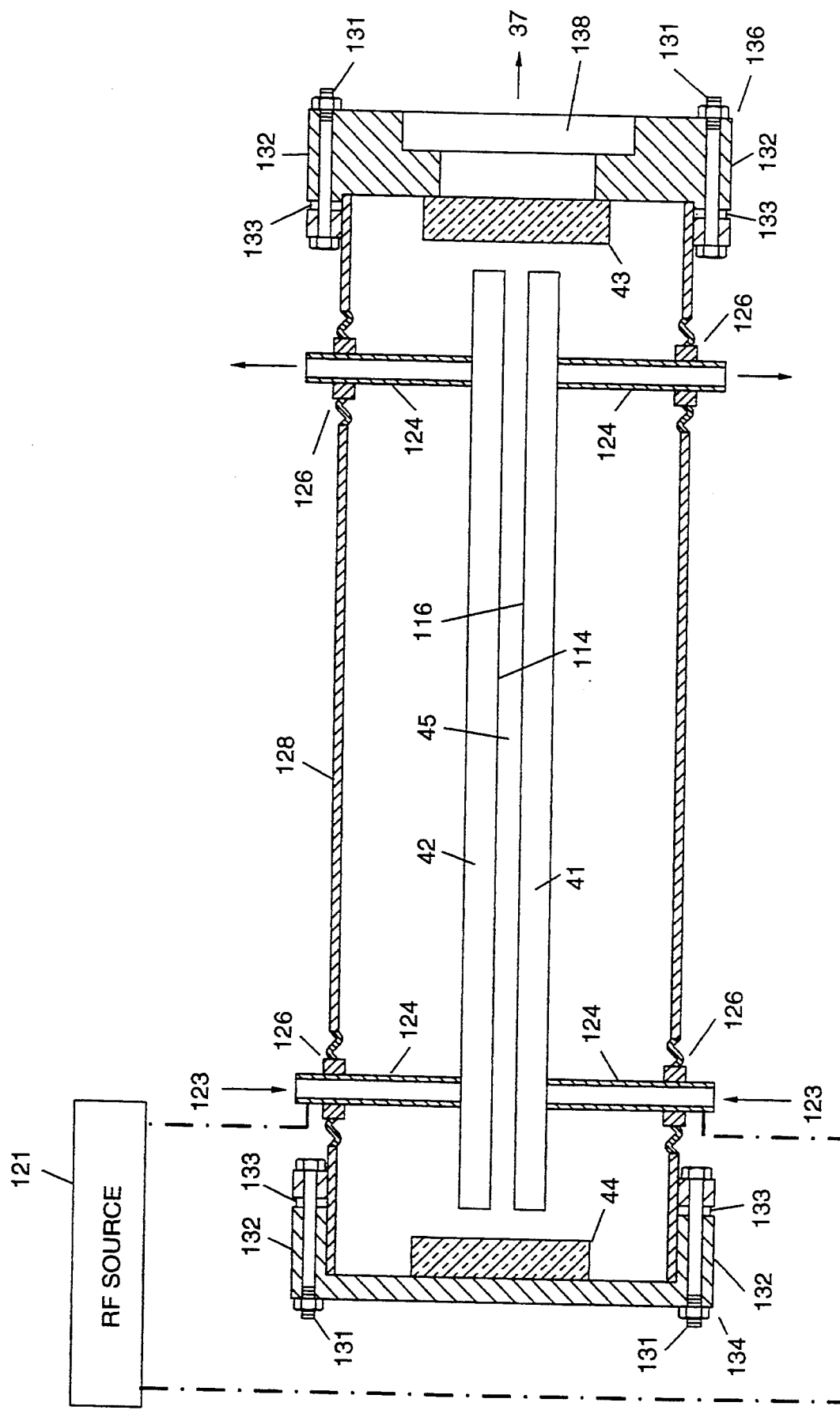
FIG. 5 is a schematic longitudinal section of the embodiment of a slab $CO_2$ laser array shown in FIG. 4.

The source of phase related light shown in FIG. 3 is a laser oscillator 40 consisting of a slab laser phased array aligned with the amplifier array to couple light 37 to the input of the amplifier array. The basic construction of a laser oscillator that produces co-phasal light is shown in more detail in FIG. 4, 5 and 6. The laser oscillator 40 includes two waveguiding electrodes 41 and 42 having parallel waveguiding surfaces 115 and 114 defining a channel 45 between them, and two resonator mirrors 43 and 44 at opposed ends of the channel 45. The electrodes 41 and 42 are made for example of polished and oxidized aluminum, and are separated by dielectric supports 117. The gap between the electrode surfaces defines the depth of the channel 45, while the electrode surfaces between the resonator mirrors 43 and 44 define the extent of the channel. The gap, that is, the depth of the channel 45 is preferably selected so that the electrode surfaces define a waveguide to guide light propagating in planes perpendicular to the plane of the electrodes. The waveguiding limitation, it is believed, limits the gap to a depth of about 4 mm. However, in the embodiment shown the gap is about 2.5 mm. The electrodes 41, 42 are 20 cm long. The mirrors 43 and 44 define an array of stable laser resonators across the electrode width. Such a laser oscillator 40 is described in my co-pending U.S. Pat. application No. 07/822,035, abandoned Feb. 16, 1994. The electrodes may be slightly curved, as forming a cylindrical array, or they may be slightly divergent, though substantially parallel, so long as the modal quality of the light is not unduly affected.

Cooling water indicated at 123 from a source of cooling water and 72 MHz electrical power from an rf power source 121 (with power matching network) for the electrodes is supplied through hollow aluminum posts 124 which connect to the electrodes 41 and 42. The posts 124 are mounted into insulating feedthroughs 126 which pass through the walls of a steel tube 128. The feedthroughs are formed by insulating collars 125 sealed against the posts 124, and bellows 127 connecting the collars 125 to the steel tube 128. Cooling water as shown at the points 123 passes into and out of the posts 124 through a T junction and tubes 130 that run through a greater part of the length of the electrodes 41 and 42. Inside the steel tube 128 are suitable lasing sustaining gases at reduced pressure.

The plane mirrors 43 and 44 are mounted onto adjustable flanges 132 at ends 134 and 136 respectively of the steel tube 128, and are separated by about 2 mm from the end of the channel 45. The adjustable flanges 132 are secured with pins 131 and sealed with seals 133. Light 37 emerging from the channel 45 passes through the mirror 43 and through a window 138 in the flange 136.

Figure 6:
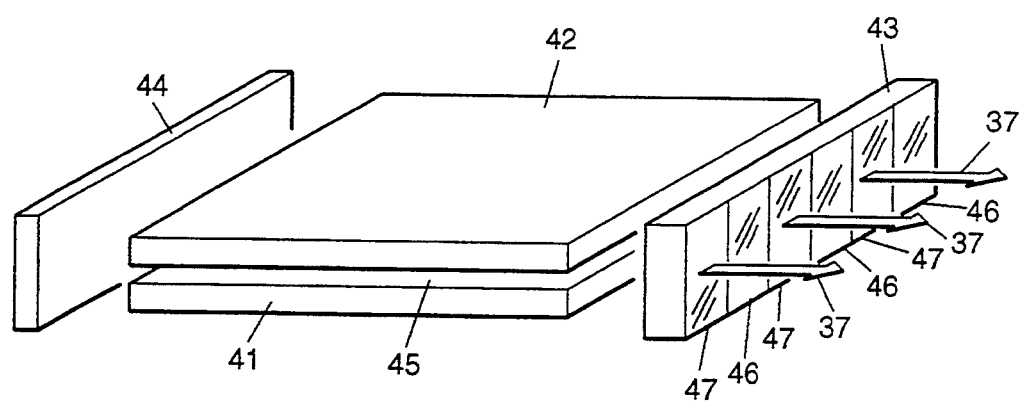
FIG. 6 is a schematic showing the resonator for the source of co-phasal input laser beams shown in FIGS. 4 and 5.
Figure 7:
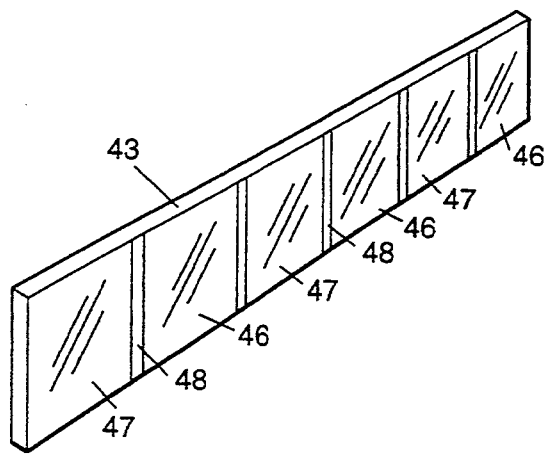
FIG. 7 is a schematic showing a segmented mirror for the resonator of FIG. 6.

In this embodiment the array of resonators is modified from that disclosed in my co-pending application Ser. No. 07/822,035. The resonator for the slab laser array is shown in FIG. 6. One 100% reflecting plane mirror 44, is used for all resonator elements. A segmented coupling. plane mirror 43 is used as the other resonator mirror. Each segment defines a resonator element in the laser array. The segmented mirror 43 is shown in detail in FIG. 7 and is composed of mirror elements 46 and 47 separated by non-reflecting strips 48. The mirror elements 46 and 47 are about 2.5 mm wide which when combined with the 2.25 mm electrode gap produces an array of elliptical cross section laser beams. The reflectivity of the elements 46 is approximately 100%. The elements 47 have reflectivity of about 80%. The output from the laser array is hence limited to elements 47. An alternative embodiment is to use a totally reflecting mirror 43 having openings (corresponding therefore to 0% reflectivity) in place of elements 47 for the light to pass out from the resonator. In such a case, the lasing threshold is increased, but phase coupled light may still be obtained as output from the laser.

The three laser beams 37 are separated by 2.5 mm and have a width of 2.5 mm so that the beams couple efficiently to the amplifier array. Coupling from resonator elements with two 100% reflectors at either end of the channel occur by diffraction to neighbouring resonator elements. The oscillator and amplifier of the embodiment shown in FIG. 3 are separate laser structure. However, it is anticipated that the oscillator element could be combined with the same electrode structure used for an amplifier array.

Figure 8:
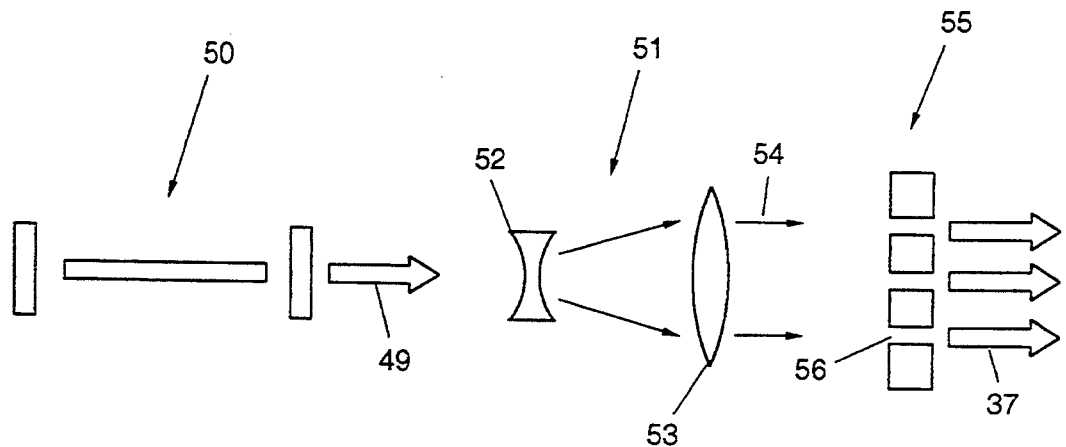
FIG. 8 is a schematic showing another example of a source of co-phasal input laser beams for the array of FIGS. 1 or 3.

An alternative but less efficient means for generating an array of oscillator laser beams is shown in FIG. 8. A single mode laser beam 49 from, for example, a waveguide laser 50 is expanded through a refractive telescope 51 with cylindrical lenses 52 and 53. The resulting continuous phase laser beam 54 is then passed through an aperture 55 with three circular stops 56 of 2.5 mm diameter, thus effectively providing for division of the phase coherent beam into several phase coherent beams. The emerging array of beams 37 will couple into three amplifiers as shown in FIG. 3. Diffraction effects at the apertures will reduce the efficiency of exciting first order propagation in the waveguide.

Figure 9:
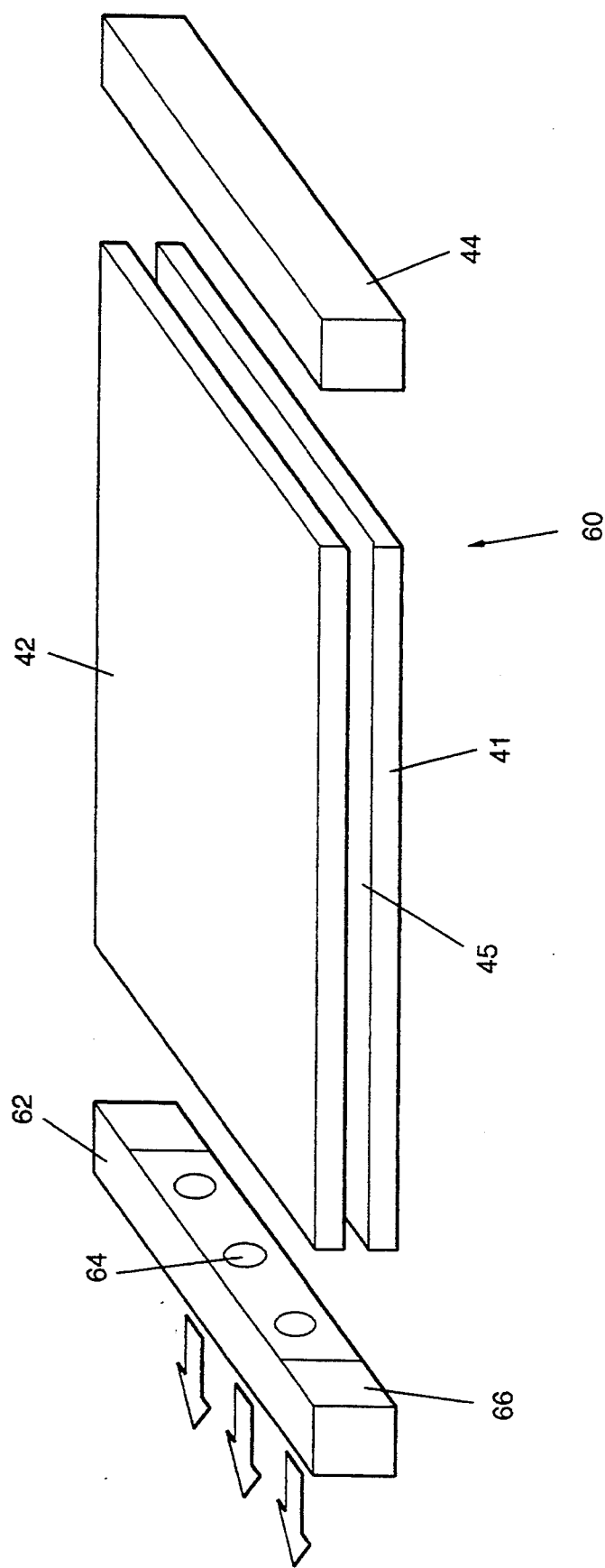
FIG. 9 is a schematic of a further laser resonator for providing phase locked light.

Other sources of phase coupled laser beams may be used such as that described by Bridges et al, U.S. Pat. No. 4,884,282. Also, the laser shown in FIGS. 4, 5 and 6 for coupling to a regenerative amplifier array may be simplified by removing the partial transmitting resonator mirror 43 and substituting a 100% reflective mirror 62 with apertures 64 in it as shown in FIG. 9. The laser oscillator 60 shown in FIG. 9 includes two waveguiding electrodes 41 and 42 of the same type as those shown in FIGS. 4, 5 and 6, defining a channel 45 between them, and two resonator mirrors 62 and 44 at opposed ends of the channel 45. The apertures 64 are formed by drilling into the mirror 62. Making the mirror fully reflecting results in large difraction losses through the three holes. The mirror 62 is also preferably extended to increase the number of totally reflecting resonator elements by adding totally reflective portions 66 at either side of the holes 64. The apertures 64 are 2 mm wide with 4.8 mm center to center spacing. The mirror itself is 30 mm wide, and the elements 66 are separated from the rest of the mirror by scribing of the mirror surface.

Figure 10:
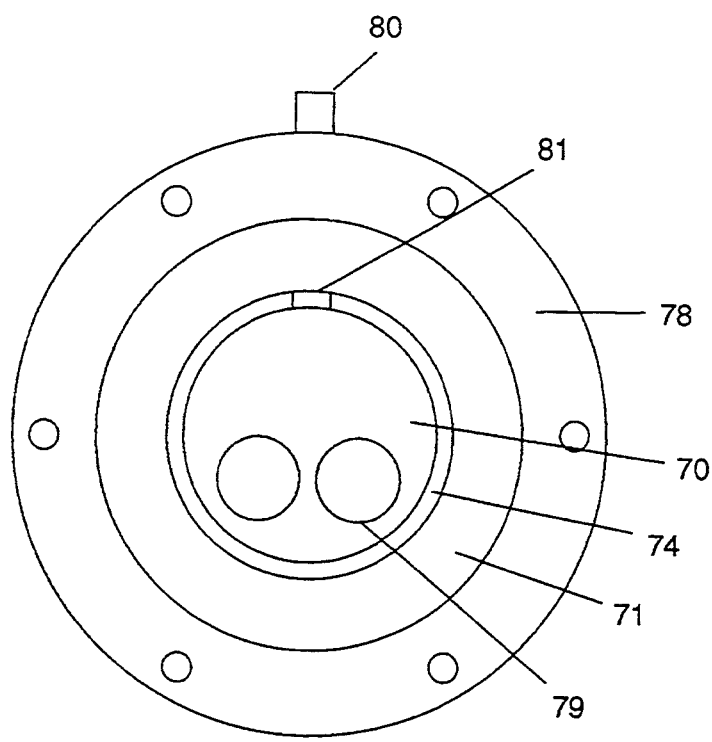
FIG. 10 is an end view of a laser resonator with circular electrodes for providing phased locked light.
Figure 11:
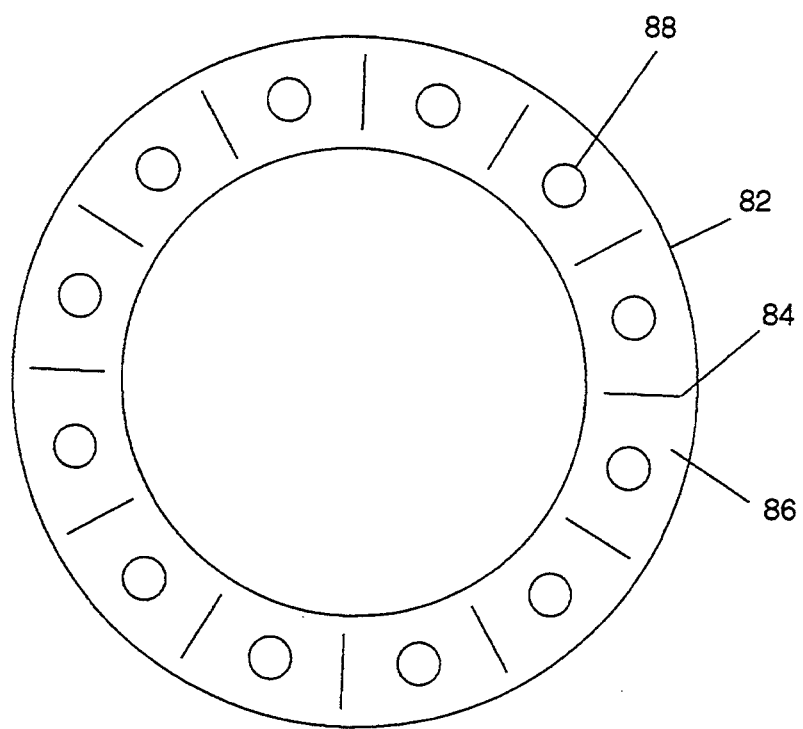
FIG. 11 is an end view of a mirror for use in the laser resonator of FIG. 10.
Figure 12:
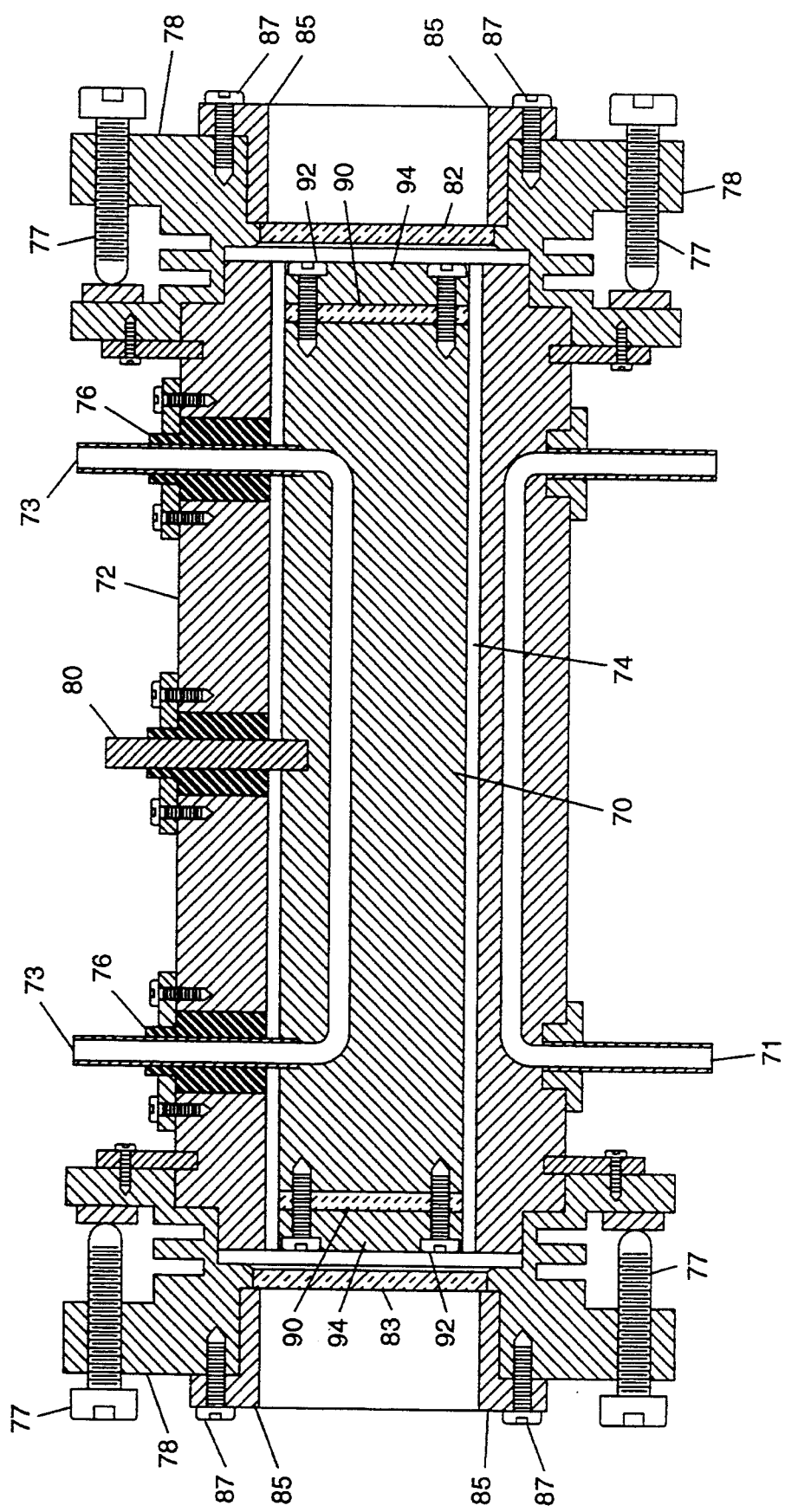
FIG. 12 is a longitudinal section through a laser with circular concentric electrodes.

If the electrodes of an amplifier array are tapered and form a radial array it is desirable to use a slab $CO_2$ laser array with curved electrodes as shown in FIGS. 10 and 12 to excite the amplifier. This ensures the same amplified path length for each amplifier. An inner electrode 70 of radius 15 mm and outer electrode 72 of radius 17 mm are concentric and separated by a cylindrical annular gap 74 of 2 mm depth. The outer electrode 72 is externally water cooled using cooling channel 71 and the inner electrode is cooled using cooling channel 73 passing through the outer electrode 72 in insulated vacuum feedthroughs 76. The inner electrode 70 is drilled along its length as shown at 79 to provide a reservoir of laser gas. A 7 mm wide spacer 81 is placed between and extending along the electrodes 70 and 72 to position the electrodes with respect to each other. End mirrors 82 and 83 are mounted on flanges 78 to the electrodes 70 and 72 and adjusted using screws 77. The mirrors 82 and 83 are held in the flanges 78 with retainers 85 and pins 87. Electrical feedthrough 80 supplies 70 Mhz rf power to the inner electrode 70 while the outer electrode 72 is grounded. The rf power source creates a discharge between the waveguiding electrode surfaces except where the 7 mm wide spacer interrupts the waveguide gap. The inner electrode has 1 cm insulated ceramic annular caps 90 on each end secured by pins 92. The ends 94 of the inner electrode 70 provide a continuous waveguide up to within 2 mm of the resonator mirror but the ceramic caps prevent the discharge from occuring closer than 1.2 cm from the mirrors 82 and 83. This prevents damage to the mirror surfaces. The laser resonator array is formed by placing plane 100% reflecting mirrors 82, 83 at respective ends of the laser tube. One mirror 82 as shown in FIG. 11 has an array of apertures 88 drilled in a circular pattern with 16 mm radius (to the center of the apertures) as in the mirror shown in FIG. 9. All parts are aluminum except the spacers and mirrors.

Mirror 82 is circular, but the inner part is not used, only the annular outer part is used, and totally reflecting with radial scribed lines 84 1 cm apart separating planar resonator elements 86. Each element 84 includes a 2 mm aperture 88 separated by 1 cm from adjacent apertures drilled in the mirror 82 to allow defracted light to exit the laser resonator. The outpure of the resonator is anti-phasal and if co-phasal light is desired, then half-wavelength phase plates should be used at the aperture or elsewhere in the path of the output beam to correct the phase of alternating elements.

The resonator shown in FIG. 10 behaves in a similar manner to a perfectly flat electrode resonator slab laser because the individual resonator elements have electrodes which are functionally flat. The electrode curvature does not significantly affect the oscillation of each resonator and diffraction strongly couples the resonator elements to produce a phase locked array. A segment of this cylindrical array may be used to couple several laser beams into a regenerative amplifier array in which tapered electrodes are used (extending radially from a common axis). Alternatively, the individual beams may be brought into close proximity with an axicon telescope, in a manner commonly used with conventional cylindrical unstable resonators. When combined, the beams form a single beam which may be manipulated with conventional optics.

The embodiments of the invention in which an exclusive property or privilege is claimed are defined as follows:

1. A regenerative amplifier laser array comprising:

an array of slab lasers, each slab laser including a pair of spaced apart parallel electrodes forming a channel between them, each channel having first and second sides and first and second ends;

each channel having resonator mirrors positioned at the first and second ends, the resonator mirrors in combination with the electrodes forming phase related resonators in each of which propagating light in the laser walks from the first side to the second side of each of the channels, light from each of the slab lasers being taken from the second side of the respective channels;

a laser source of phase related laser beams one laser beam for each slab laser, the source of phase related laser beams being aligned with the array of slab lasers to provide phase related light beams simultaneously to each first side of the slab lasers;

the source of phase related laser beams including plural waveguiding laser resonators having phase related output;

the plural waveguiding laser resonators each including first and second concentric waveguiding electrodes spaced to form a gap between them and first and second mirrors positioned at opposite ends of the gap, the electrodes and mirrors defining an array of open stable resonators forming part of a cylinder, the source of phase related laser beams providing phase related laser beams, one laser beam for each laser resonator.

2. A regenerative amplifier laser array comprising:

an array of slab lasers, each slab laser including a pair of spaced apart parallel electrodes forming a channel between them, each channel having first and second sides and first and second ends;

each channel having resonator mirrors positioned at the first and second ends, the resonator mirrors in combination with the electrodes forming phase related resonators in each of which propagating light in the laser walks from the first side to the second side of each of the channels, light from each of the slab lasers being taken from the second side of the respective channels;

a laser source of phase related laser beams one laser beam for each slab laser, the source of phase related laser beams being aligned with the array of slab lasers to provide phase related light beams simultaneously to each first side of the slab lasers;

the source of phase related laser beams including plural waveguiding laser resonators having phase related output;

the plural waveguiding laser resonators each including first and second spaced waveguiding electrodes to form a gap between them and first and second mirrors positioned at opposite ends of the gap, the electrodes and mirrors defining an array of open stable resonators, the source of phase related laser beams providing phase related laser beams, one laser beam for each laser resonator; and in which;

the first and second mirrors are both totally reflecting and one mirror is provided with spaced apertures to allow light to diffract out of the laser source.

3. A regenerative amplifier laser array comprising:

an array of slab lasers, each slab laser including a pair of spaced apart parallel electrodes forming a channel between them, each channel having first and second sides and first and second ends;

each channel having resonator mirrors positioned at the first and second ends, the resonator mirrors in combination with the electrodes forming phase related resonators in each of which propagating light in the laser walks from the first side to the second side of each of the channels, light from each of the slab lasers being taken from the second side of the respective channels;

a laser source of phase related laser beams one laser beam for each slab laser, the source of phase related laser beams being aligned with the array of slab lasers to provide phase related light beams simultaneously to each first side of the slab lasers; and the source of phase related laser beams including a single source of single mode laser light directed at an aperture having plural stops.

4. The regenerative amplifier laser array of claim 3 in which each slab laser shares common resonator mirrors, one resonator mirror being used at the first end for all of the slab lasers and one resonator mirror being used at the second end for all of the slab lasers.

5. An array of slab lasers comprising:

at least first and second parallel waveguiding electrode surfaces spaced to define a channel between them in which propagating light is guided;

the first and second parallel waveguiding electrode surfaces having first and second opposed ends spaced apart from each other in a first direction;

a laser sustaining gas in the channel;

means to provide electromagnetic excitation through the electrode surfaces to the laser sustaining gas;

one or more resonators, each formed of first and second mirrors disposed at the first and second ends of the channel respectively and each resonator forming an open resonator that is open in directions parallel to the waveguiding electrode surfaces and perpendicular to the first direction;

one of the first and second mirrors being totally reflecting and being provided with a plurality of apertures to allow light to exit from the channel; and means to separate the channel into a plurality of parallel laser resonator sections, one laser resonator section corresponding to each resonator, each parallel laser resonator being laser coupled to another resonator to produce phase related output.

6. An array of slab lasers comprising:

at least first and second parallel waveguiding electrode surfaces spaced to define a channel between them in which propagating light is guided;

the first and second parallel waveguiding electrode surfaces having first and second opposed ends spaced apart from each other in a first direction, and being curved to form at least part of a cylinder;

a laser sustaining gas in the channel;

means to provide electromagnetic excitation through the electrode surfaces to the laser sustaining gas;

one or more resonators, each formed of first and second mirrors disposed at the first and second ends of the channel respectively and each resonator forming an open resonator that is open in directions parallel to the waveguiding electrode surfaces and perpendicular to the first direction; and means to separate the channel into a plurality of parallel laser resonator sections, one laser resonator section corresponding to each resonator, each parallel laser resonator being laser coupled to another resonator to produce phase related output.

7. The array of slab lasers of claim 6 in which one of the first and second mirrors is totally reflecting and is provided with a plurality of apertures to allow light to exit from the channel.

8. An array of slab lasers comprising:

at least first and second parallel waveguiding electrode surfaces spaced to define a channel between them in which propagating light is guided;

the first and second parallel waveguiding electrode surfaces having first and second opposed ends spaced apart from each other in a first direction;

a laser sustaining gas in the channel;

means to provide electromagnetic excitation through the electrode surfaces to the laser sustaining gas;

one or more stable resonators, each formed of first and second mirrors disposed at the first and second ends of the channel respectively and each stable resonator forming an open resonator that is open in directions parallel to the waveguiding electrode surfaces and perpendicular to the first direction; and means to separate the channel into a plurality of parallel laser resonator sections, one laser resonator section corresponding to each stable resonator, each parallel laser resonator being laser coupled to another resonator to produce phase related output.

9. The array of slab lasers of claim 8 in which the one or more stable resonators is formed of a first planar mirror disposed at one end of the channel and a second planar mirror parallel to the first planar mirror and disposed at the other end of the channel.

10. The array of slab lasers of claim 9 in which the first and second mirrors are each segmented by a plurality of non-reflecting strips to form first and second sets of corresponding mirror segments defining the plurality of parallel laser resonators.

11. The array of slab lasers of claim 9 in which the plane parallel mirrors are segmented by non-reflecting material superimposed on the mirrors.

12. The array of slab lasers of claim 9 in which the first and second waveguiding parallel electrode surfaces are each continuous.

13. The array of slab lasers of claim 9 in which each laser resonator is coupled to adjacent resonators by diffraction losses.

14. The array of slab lasers of claim 8 in which each laser resonator is coupled to adjacent resonators by diffraction losses, 15. The array of slab lasers of claim 8 in which the electrodes surfaces are concentric to each other.

16. The array of slab lasers of claim 15 in which the electrode surfaces are curved to form at least a part of a cylinder.

17. The array of slab lasers of claim 8 in which one of the first and second mirrors is totally reflecting and is provided with a plurality of apertures to allow light to exit from the channel.

* * * * *